(12) United States Patent
Zhao et al.

(10) Patent No.: US 10,651,946 B1
(45) Date of Patent: May 12, 2020

(54) IN-FIELD CALIBRATION OF LASER TRANSMITTER

(71) Applicant: Google LLC, Mountain View, CA (US)

(72) Inventors: Xiangjun Zhao, Fremont, CA (US);
Satrukaan Sivagnanasuntharam, Sunnyvale, CA (US); Shuang Yin, Sunnyvale, CA (US); Cedric Fung Lam, San Carlos, CA (US); Liang Du, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/426,193

(22) Filed: May 30, 2019

(51) Int. Cl.
| | |
|---|---|
| *H04B 10/08* | (2006.01) |
| *H04B 10/572* | (2013.01) |
| *H04B 10/079* | (2013.01) |
| *H04B 10/27* | (2013.01) |
| *H04B 10/50* | (2013.01) |
| *H04J 14/02* | (2006.01) |

(52) U.S. Cl.
CPC ..... *H04B 10/572* (2013.01); *H04B 10/07953* (2013.01); *H04B 10/07957* (2013.01); *H04B 10/27* (2013.01); *H04B 10/503* (2013.01); *H04J 14/0227* (2013.01)

(58) Field of Classification Search
CPC ........... H04B 10/572; H04B 10/07953; H04B 10/07957; H04B 10/27; H04B 10/503; H04B 10/272; H04B 10/073; H04B 10/0775; H04B 10/0799; H04B 17/11; H04B 10/07951; H04B 10/0795; H04B 10/506; H04B 10/032; H04B 10/0791; H04B 10/07955; H04B 10/0793; H04B 10/564; H04J 14/0227; H04J 14/0282; H04J 14/02; H04J 14/0252; H04J 14/0257; H04J 14/0297; H04J 2203/006; H04J 3/14; H01S 5/06256; H04Q 11/0067; H04Q 2011/0043; H04Q 2011/0081
USPC ........ 398/17, 22, 23, 24, 25, 66, 67, 68, 70, 398/72, 20

See application file for complete search history.

(56) References Cited

U.S. PATENT DOCUMENTS

| | | | |
|---|---|---|---|
| 8,532,482 B2* | 9/2013 | Yang .................. | H04B 10/0791 398/10 |
| 8,744,265 B2* | 6/2014 | Effenberger ......... | H04B 10/272 398/14 |
| 9,281,899 B2* | 3/2016 | Wang .................. | H04B 10/564 |
| 9,473,246 B2 | 10/2016 | Grobe et al. | |
| 9,768,905 B2* | 9/2017 | Wu ..................... | H04B 10/0773 |
| 9,853,764 B2* | 12/2017 | Khotimsky ......... | H04J 14/0257 |

(Continued)

*Primary Examiner* — Hibret A Woldekidan
(74) *Attorney, Agent, or Firm* — Honigman LLP; Brett A. Krueger

(57) ABSTRACT

A method for in-field calibration of a laser transmitter includes receiving, at an optical network unit (ONU), a downstream connection from an optical line terminal (OLT) where the ONU includes a Distributed Bragg Reflector (DBR) laser. The method further includes attempting to establish an upstream connection between the ONU and the OLT. When the ONU establishes the upstream connection to the OLT, the method also includes receiving, at the ONU, a message to initiate calibration of the ONU where the message is generated to indicate that the DBR laser is operating outside an operational state. The method further includes tuning, by the ONU, the DBR laser to the operational state by adjusting an injection current for the DBR laser.

32 Claims, 8 Drawing Sheets

(56) References Cited

U.S. PATENT DOCUMENTS

| | | | | |
|---|---|---|---|---|
| 9,991,954 B2* | 6/2018 | Fu | ............... | H04B 10/07957 |
| 10,129,614 B2* | 11/2018 | Gao | ............... | H04Q 11/0005 |
| 10,277,327 B2* | 4/2019 | Levesque | ............... | H04Q 11/0005 |
| 2007/0242954 A1* | 10/2007 | Sackman | ............... | H04B 10/0793 |
| | | | | 398/71 |
| 2008/0304825 A1* | 12/2008 | Mahony | ............... | H04Q 11/0067 |
| | | | | 398/38 |
| 2014/0029635 A1* | 1/2014 | Biegert | ............... | H01S 3/02 |
| | | | | 372/38.04 |
| 2015/0318930 A1* | 11/2015 | Grobe | ............... | H04J 14/02 |
| | | | | 398/79 |
| 2016/0099792 A1* | 4/2016 | Gao | ............... | H04J 14/0257 |
| | | | | 398/69 |
| 2017/0155982 A1* | 6/2017 | Gao | ............... | H04B 10/073 |

* cited by examiner

IN-FIELD CALIBRATION OF LASER TRANSMITTER

TECHNICAL FIELD

This disclosure relates to in-field calibration of a laser transmitter.

BACKGROUND

Fiber optic communication is an emerging method of transmitting information from a source (transmitter) to a destination (receiver) using optical fibers as the communication channel. A Wavelength-Division Multiplexing Passive Optical Network (WDM-PON) is an optical technology for access and backhaul networks. WDM-PON uses multiple different wavelengths over a physical point-to-multipoint fiber infrastructure that contains passive optical components. The use of different wavelengths allows for traffic separation within the same physical fiber. The result is a network that provides logical point-to-point connections over a physical point-to-multipoint network topology. WDM-PON allows operators to deliver high bandwidth to multiple endpoints over long distances. A PON generally includes an optical line terminal (OLT) located at a service provider central office (e.g., a hub), a remote node connected to the central office by a feeder fiber, and a number of optical network units (ONUs) (e.g., optical network terminals (ONTs)), near end users.

An ONU typically includes a laser to generate an optical signal transmitted to the OLT. The ONU laser may be a Distributed Bragg Reflector (DBR) laser. A distributed Bragg reflector laser (DBR) is a type of stable, low-noise, single frequency laser diode. The DBR laser structure is fabricated with surface features that define a monolithic, single-mode ridge waveguide that runs the entire length of the device. The DBR laser includes a resonant cavity with a highly reflective DBR mirror on one end, and a low reflectivity cleaved exit facet on the other end. The laser emits from the exit facet opposite the DBR end. The DBR mirror reflects only a single longitudinal mode. As a result, the laser operates on a single spatial and longitudinal mode. The resonant cavity includes a gain ridge portion. The DBR is continuously tunable by changing injection current or temperature. Increasing current in the gain region causes a red shift in laser output due to heating. However, the reflectivity curve of the exit facet does not change. As a result, the exit facet will experience loss of reflectivity at the longer wavelengths and eventually will induce a discontinuous blue shift in the wavelength to find a higher gain mode.

SUMMARY

One aspect of the disclosure provides a method for in-field calibration of a laser transmitter. The method includes determining, by data processing hardware, that a connection between an optical line terminal (OLT) and an optical network unit (ONU) fails to satisfy a connection quality criteria. The ONU includes a Distributed Bragg Reflector (DBR) laser. The method further includes executing, by the data processing hardware, a self-calibration routine to determine a working wavelength range for the DBR laser that maintains the connection between the OLT and the ONU and satisfies the connection quality criteria. The self-calibration routine iteratively includes the following: tuning an injection current of the DBR laser to adjust a communication wavelength of the ONU; determining whether the communication wavelength establishes or maintains the connection between the OLT and the ONU; when the communication wavelength establishes or maintains the connection between the OLT and the ONU, determining whether the connection satisfies the connection quality criteria; and when the connection satisfies the connection quality criteria, updating the working wavelength range for the DBR laser to include the communication wavelength.

Another aspect of the disclosure provides a system for in-field calibration of a laser transmitter. The system includes data processing hardware and memory hardware in communication with the data processing hardware. The memory hardware stores instructions that when executed on the data processing hardware cause the data processing hardware to perform operations. The operations include determining that a connection between an optical line terminal (OLT) and an optical network unit (ONU) fails to satisfy a connection quality criteria. The ONU includes a Distributed Bragg Reflector (DBR) laser. The operations further includes executing a self-calibration routine to determine a working wavelength range for the DBR laser that maintains the connection between the OLT and the ONU and satisfies the connection quality criteria. The self-calibration routine iteratively includes the following: tuning an injection current of the DBR laser to adjust a communication wavelength of the ONU; determining whether the communication wavelength establishes or maintains the connection between the OLT and the ONU; when the communication wavelength establishes or maintains the connection between the OLT and the ONU, determining whether the connection satisfies the connection quality criteria; and when the connection satisfies the connection quality criteria, updating the working wavelength range for the DBR laser to include the communication wavelength.

Implementations of the disclosure may include one or more of the following optional features. In some implementations, the connection quality criteria includes satisfying at least one of a packet loss threshold, a loss of frame (LOF) indicator, a start-up failure (SUF) indicator, or a loss of connection indicator. In some examples, determining that the connection between the OLT and the ONU fails to satisfy the connection quality criteria includes receiving a physical layer operations, administrations, and maintenance (PLOAM) message from the OLT indicating a failure to satisfy the connection quality criteria. In some configurations, determining that the connection between the OLT and the ONU fails to satisfy the connection quality criteria includes receiving, from firmware of the ONU a loss of frame (LOF) indicator, a loss of signal (LOS) indicator, or a start-up failure (SUF) indicator. In some examples, determining that the connection between the OLT and the ONU fails to satisfy the connection quality criteria includes receiving, from firmware of the ONU, a deactivate (DACT) indicator. In these examples, determining that the connection satisfies the connection quality criteria includes determining that data processing hardware of the ONU has cleared the DACT indicator. Optionally, determining that the connection between the OLT and the ONU fails to satisfy the connection quality criteria includes receiving, from firmware of the OLT a loss of frame (LOF) indicator or a loss of signal (LOS) indicator.

In some configurations, the self-calibration routine also includes determining a maximum wavelength of the working wavelength range and a minimum wavelength of the working wavelength range and setting the injection current of the DBR laser to an operating injection current within the working wavelength range. In these configurations, the operating injection current includes a mean or median of the working wavelength range.

Another aspect of the disclosure provides a method for in-field calibration of a laser transmitter. The method includes receiving, at data processing hardware of an optical network unit (ONU), a downstream connection from an optical line terminal (OLT) where the ONU includes a Distributed Bragg Reflector (DBR) laser. The method further includes attempting, by the data processing hardware, to establish an upstream connection between the ONU and the OLT. When the ONU establishes the upstream connection to the OLT, the method also includes receiving, at the data processing hardware of the ONU, a message to initiate calibration of the ONU where the message is generated to indicate that the DBR laser is operating outside an operational state. The method further includes tuning, by the data processing hardware of the ONU, the DBR laser to the operational state by adjusting an injection current for the DBR laser.

Another aspect of the disclosure provides a system for in-field calibration of a laser transmitter. The system includes an optical network unit (ONU) including a Distributed Bragg Reflector (DBR) laser, data processing hardware, and memory hardware in communication with the data processing hardware. The memory hardware stores instructions that when executed on the data processing hardware cause the data processing hardware to perform operations. The operations include receiving a downstream connection from an optical line terminal (OLT) to the ONU. The operations further include attempting to establish an upstream connection between the ONU and the OLT. When the ONU establishes the upstream connection to the OLT, the operations also include receiving a message to initiate calibration of the ONU where the message is generated to indicate that the DBR laser is operating outside an operational state. The operations further include tuning the DBR laser to the operational state by adjusting an injection current for the DBR laser.

These aspects may include one or more of the following optional features. In some examples, tuning the DBR laser to the operational state includes the following: adjusting the injection current for the DBR laser to a first injection current; determining that the first injection current for the DBR laser establishes the upstream connection between the ONU and the OLT; identifying the first injection current as a first boundary of an operating window of the operational state of the DBR laser; adjusting the injection current for the DBR laser to a second injection current; determining that the second injection current for the DBR laser fails to maintain or establish the upstream connection between the ONU and the OLT; identifying the second injection current as a second boundary of the operating window of the operational state of the DBR laser; and supplying an operating injection current to the DBR laser, the operating injection current being between the first injection current and the second injection current. The operating injection current may be a mean of or a median of the first injection current and the second injection current. In these examples, adjusting the injection current for the DBR laser to the first injection current may include incrementally altering the injection current. Determining that the second injection current for the DBR laser fails to maintain or establish the upstream connection between the ONU and the OLT may include receiving a start-up failure (SUF) indicator or a deactivate (DACT) indicator at the ONU. Receiving a DACT indicator at the ONU may indicate failure to satisfy the bit error threshold.

In these examples, when the ONU fails to establish the upstream connection to the OLT, the method may further include initiating calibration of the ONU. Moreover, when the ONU establishes the upstream connection to the OLT, the method may also include communicating data from the ONU at a bit error rate that satisfies a bit error threshold where the bit error threshold indicates an acceptable level of error for transmission of data by the ONU.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
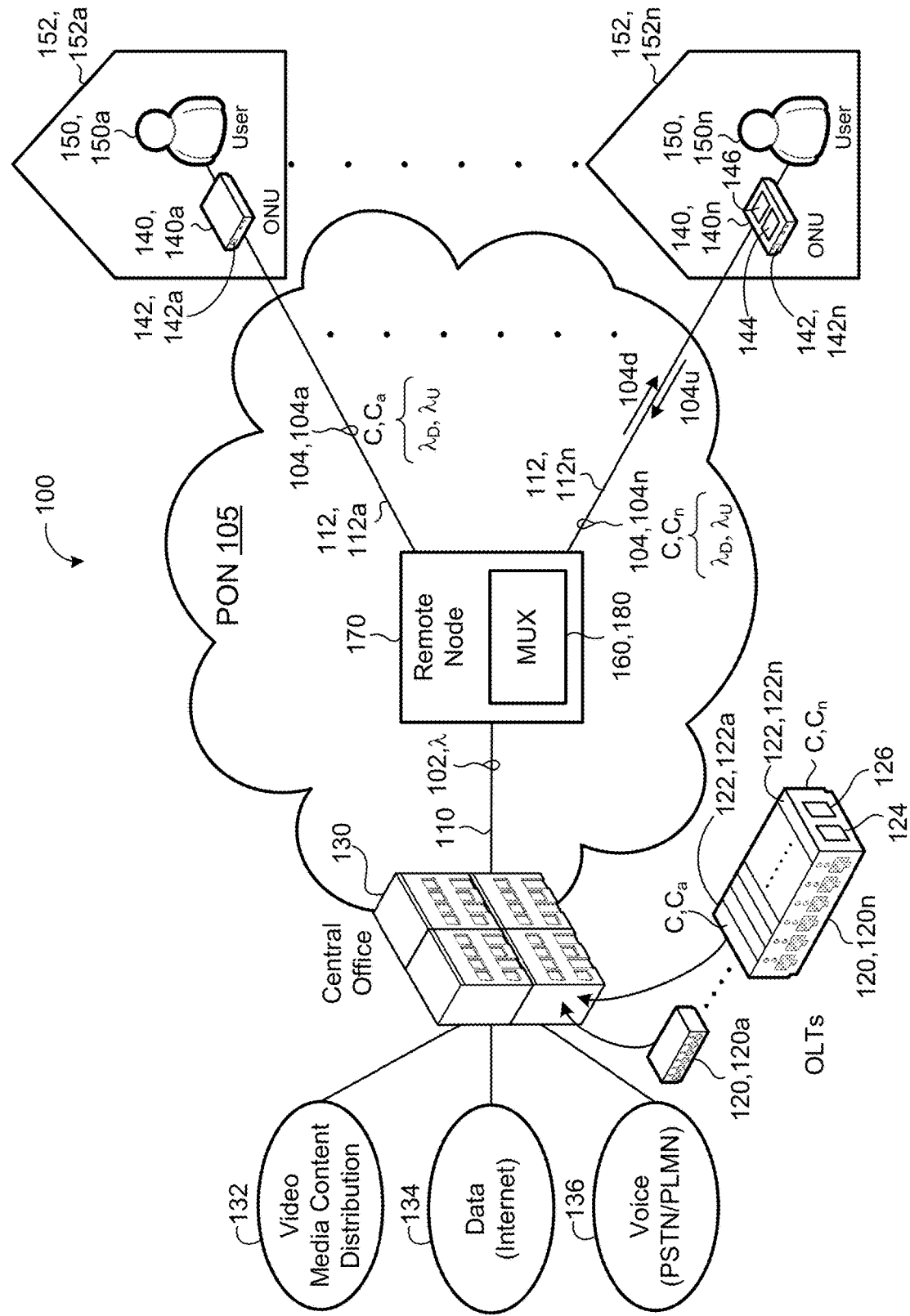
FIG. 1 is a schematic view of an example communication system.

Increasingly, Internet Service Providers (ISPs) use Passive Optical Networks (PONs) to provide high-speed connectivity to private residences and small businesses. ISPs find PONs attractive due to high reliability and/or low cost. By using passive components to split optical signals, PONs avoid the complexity of maintaining electrically powered equipment in an outdoor environment. In a typical PON, one or more Optical Line Terminals (OLTs) are installed at the ISP's Central Office (CO) and an Optical Network Unit (ONU) is installed at each user site, remote from the ISP's CO. The ONU typically includes a laser to generate an optical signal transmitted to the OLT. The ONU laser may be a Distributed Bragg Reflector (DBR) laser.

ONUs using DBR lasers may fail, necessitating field replacement. Repairing or replacing a failed ONU may require dispatching a service technician to a remote user site. The user may be without network connectivity until the service technician is able to access the user site. One source of ONU failure is reduced optical signal power at the transmission wavelength of the DBR laser. ONUs that have failed in the field may be restored to operation by recalibrating the DBR laser.

This disclosure describes, inter alia, a method for calibrating a DBR laser in-situ. The method can be performed on commercially available ONUs without adding significant cost or complexity to the ONU. By enabling the ONU to perform in-situ DBR laser calibration, a failed ONU may be restored to operation without the cost or extended loss of communication imposed by field replacement.

One aspect of the disclosure provides a method for performing an in-situ calibration of the Distributed Bragg Reflector (DBR) laser of an optical network unit (ONU) deployed in a passive optical network (PON) and optically coupled to an optical line terminal (OLT). In some examples, the OLT is located on the premises of a central office (CO) and is optically coupled to multiple, field-installed ONUs. In some examples, the ONU is deployed at a remote site from the CO. The in-situ calibration method determines that a connection between an OLT and an ONU fails to satisfy a connection quality criterion and executes a self-calibration routine. The connection quality criteria is typically configured by a network entity to indicate when a connection may be compromised or degraded to negatively affect a user's ability to communicate data with the PON. The self-calibration routine determines a working wavelength range for the DBR laser that maintains the connection between the OLT and the ONU and satisfies the connection quality criteria. The self-calibration tuning routine may include tuning an injection current of the DBR laser to adjust a communication wavelength of the ONU and determining whether the communication wavelength establishes or maintains the connection between the OLT and the ONU. The tuning routine may further include determining whether the connection satisfies the connection quality criteria and updating the working wavelength range for the DBR laser when the connection satisfies the connection quality criteria.

This aspect of the disclosure may include one or more of the following optional features. In some examples, the communication quality criteria includes satisfying at least one of a packet loss threshold, a loss of frame (LOF) indicator, a start-up failure (SUF) indicator, or a loss of connection indicator. In other examples, the communication quality criteria is a bit error rate (BER) of less than one (1) in one thousand (1000). Another aspect of the disclosure provides that determining whether the communication wavelength establishes or maintains the connection between the OLT and the ONU includes receiving a physical layer operations, administrations, and maintenance (PLOAM) message from the OLT indicating the failure to satisfy the connection quality criteria.

Referring to FIG. 1, an optical communication system 100 delivers communication signals 102 (e.g., optical signals) through communication links 110, 112, 112a-n (e.g., optical fibers or line-of-sight free space optical communications) between an optical line terminal (OLT) 120 housed in a central office (CO) 130 and optical network units (ONUs) 140, 140a-n (e.g., an optical transceiver) associated with users 150, 150a-n (also referred to as customers or subscribers). The ONUs 140, 140a-n are typically located at premises 152, 152a-n of the users 150, 150a-n.

Customer premises equipment (CPE) is any terminal and associated equipment located at the premises 152 of the user 150 and connected to a carrier telecommunication channel C at a demarcation point ("demarc"). The demarc is a point established in a house, building, or complex to separate customer equipment from service provider equipment (SPE). Some examples of CPE include telephones, routers, switches, residential gateways (RG), set-top boxes, fixed mobile convergence products, home networking adapters, or Internet access gateways that enable the user 150 to access services of a communications service provider and distribute them around the premises 152 of the user 150 via a local area network (LAN). In the examples shown, the ONU 140 is CPE.

In some implementations, the optical communication system 100 implements an optical access network 105, such as a passive optical network (PON) 105, for example, for access and mobile fronthaul/backhaul networks. Some examples of optical access networks 105 include 10-Gigabit-capable PONs (XG-PONs), 10-Gigabit-capable symmetric PONs (XGS-PONs), Next Generation PONs (NG-PONs), and other PONs adhering to International Telecommunications Union (ITU) standards. In some examples, the optical communication system 100 implements a point-to-point (pt-2-pt) PON having direct connections, such as optical Ethernets, where a home-run optical link 110, 112 (e.g., fiber) extends all the way back to an OLT 120 at the CO 130 and each customer 150, 150a-n is terminated by a separate OLT 120a-n. In other examples, the optical communication system 100 implements a point-to-multi-point (pt-2-multi-pt) PON, where a shared OLT 120 services multiple customers 150, 150a-n.

The CO 130 includes at least one OLT 120 connecting the optical access network 105 to an Internet Protocol (IP), Asynchronous Transfer Mode (ATM), or Synchronous Optical Networking (SONET) backbone, for example. Therefore, each OLT 120 is an endpoint of the PON 105 and converts between electrical signals used by service provider equipment and optical signals 102 used by the PON 105. Each OLT 120, 120a-n includes at least one transceiver 122, 122a-n, depending on the implementation of the optical access network 105. The OLT 120 transmits the optical signal 102 via a corresponding transceiver 122, through a feeder fiber 110 to a remote node (RN) 170, which includes a band-multiplexer 160 configured to demultiplex the optical signal 102 and distribute demulitplexed optical signals 104 to multiple users 150, 150a-n along corresponding distribution fibers 112, 112a-n. The band-multiplexer 160 for multiplexing/demultiplexing may be an arrayed wavelength grating (AWG) 180, which is a passive optical device. In some examples, each CO 130 includes multiple OLTs 120, 120a-n, and each OLT 120 is configured to service a group of users 150. In addition, each OLT 120 may be configured to provide signals in different services. For instance, one OLT 120 provides services in XG-PON, while another OLT 120 provides services in NG-PON.

As shown in FIG. 1, the CO 130 multiplexes signals received from several sources, such as a video media distribution source 132, an Internet data source 134, and a voice data source 136, and multiplexes the received signals into one multiplexed signal 102 before sending the multiplexed optical signal 102 to the RN 170 through the feeder fiber 110. The multiplexing may be performed by the OLT 120 or a broadband network gateway (BNG) positioned at the CO 130. Typically, services are time-division-multiplexed on the packet layer.

Time-division-multiplexing (TDM) is a method of transmitting and receiving independent signals over a common signal path by using different, non-overlapping time slots. Wavelength division multiplexing (WDM) uses multiple wavelengths λ to implement point-to-multi-point communications in the PON 105. The OLT 120 serves multiple wavelengths through one fiber 110 to the band-multiplexer 160 at the RN 170, which multiplexes/demultiplexes signals between the OLT 120 and a plurality of ONUs 140, 140a-n. Multiplexing combines several input signals and outputs a combined signal. Time wavelength division multiplexing (TWDM) uses both time and wavelength dimensions to multiplex signals.

For WDM and dense-WDM (DWDM), the OLT 120 includes multiple optical transceivers 122, 122a-n. Each optical transceiver 122 transmits signals at a fixed wavelength $\lambda_D$ (referred to as a downstream wavelength) and receives optical signals 102 at a fixed wavelength $\lambda_U$ (referred to as an upstream wavelength). The downstream and upstream wavelengths $\lambda_D$, $\lambda_U$ may be the same or different. Moreover, a channel C may define a pair of downstream and upstream wavelengths $\lambda_D$, $\lambda_U$, and each optical transceiver 122, 122-n of a corresponding OLT 120 may be assigned a unique channel $C_{a\text{-}n}$.

The OLT 120 multiplexes/demultiplexes the channels C, $C_{a\text{-}n}$ of its optical transceivers 122, 122a-n for communication of an optical signal 102 through the feeder fiber 110. Whereas, the band-multiplexer 160 at the RN 170 multiplexes/demultiplexes optical signals 102, 104, 104-n between the OLT 120 and a plurality of ONUs 140, 140a-n. For example, for downstream communications, the band-multiplexer 160 demultiplexes the optical signal 102 from the OLT 120 into ONU optical signals 104, 104a-n (i.e., downstream optical signals 104d, for each corresponding ONU 140, 140a-n). For upstream communications, the band-multiplexer 160 multiplexes ONU optical signals 104, 104a-n from each corresponding ONU 140, 140a-n (i.e., upstream optical signals 104u, into the optical signal 102 for delivery to the OLT 120). To make the transmission successful, the optical transceivers 122, 122a-n of the OLT 120 match with the ONUs 140, 140a-n one-by-one. In other words, the downstream and upstream wavelengths $\lambda_D$, $\lambda_U$ (i.e., the channel C) of respective downstream and upstream optical signals 104d, 104u to and from a given ONU 140 matches the downstream and upstream wavelengths $\lambda_D$, $\lambda_U$ (i.e., the channel C) of a corresponding optical transceiver 122.

Figure 2A:
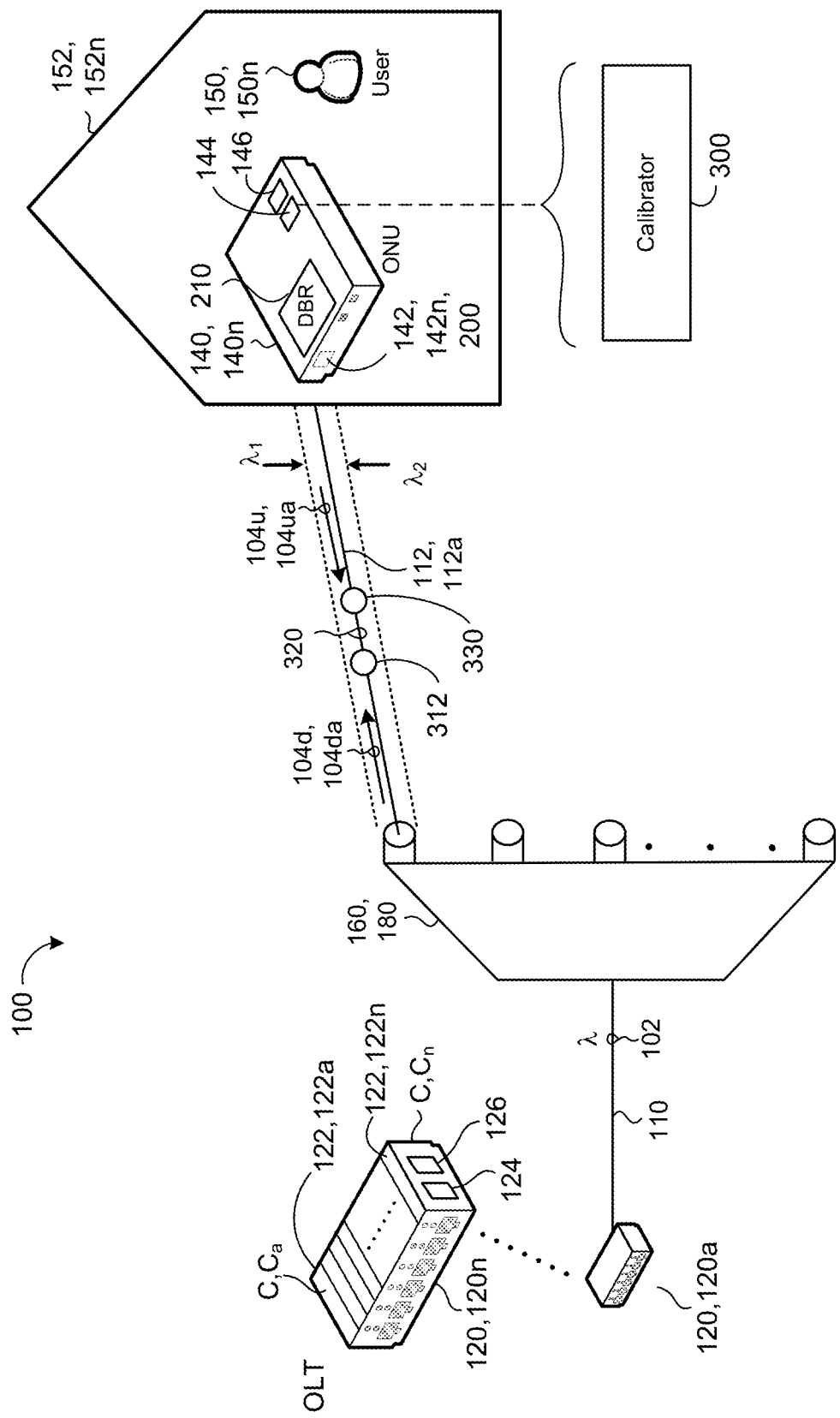
FIG. 2A is a schematic view of an example communication system including an ONU having an environment for calibrating a DBR laser.

Referring to FIG. 2A, each OLT 120 may include data processing hardware 124 and memory hardware 126 in communication with the data processing hardware 124. Examples of data processing hardware 124 include control hardware, circuitry, field programmable gate arrays (FPGAs), and so forth. The memory hardware 126 may store instructions (e.g., via firmware) that when executed on the data processing hardware 124, cause the data processing hardware 124 to perform operations to determine that a connection 320 between an optical line terminal (OLT) 120 and an optical network unit (ONU) 140 fails to satisfy one or more connection quality criteria 330. In some implementations, the quality criterion is a bit-error rate (BER) of the upstream optical signal 104u from the ONU 140 of less than one (1) in one thousand (1000). Other bit-error rate criteria may also be used. In some examples, the data processing hardware 124 of the OLT 120 determines there has been a loss of signal from the ONU 140. In some examples, the data processing hardware 124 of the OLT 120 detects loss of frame (LOF) in the upstream optical signal 104u from the ONU 140 (e.g., when the OLT 120 receives at least four invalid delimiters from the ONU 140). In some examples, the data processing hardware 124 of the OLT 120 transmits a message 312 to the ONU 140 indicating that the connection 320 fails to satisfy one or more connection quality criteria 330. The message 312 may be a physical layer operations, administrations, and maintenance (PLOAM) message. A PLOAM message format is defined in International Telegraph Union-Telecommunications Standardization Sector (ITU-T) standard G.984.3 Gigabit-capable Passive Optical Networks (G-PON): Transmission convergence layer specification. In some implementations, the message 312 is a PLOAM deactivate (DACT) message. In some implementations, a custom PLOAM message is transmitted. The message may also be any message indicating that the connection 320 fails to satisfy one or more connection quality criteria 330.

Figure 2B:
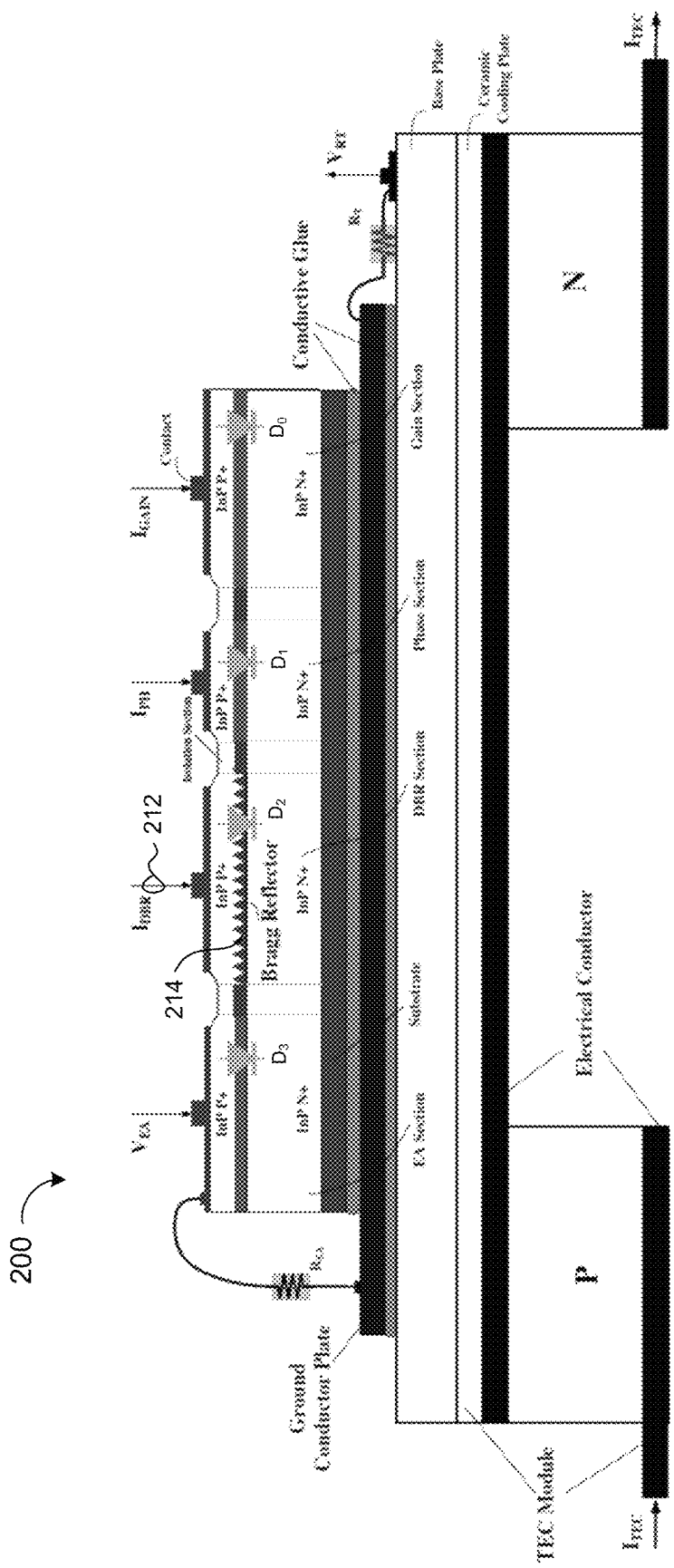
FIG. 2B is a schematic view of an example multi-section laser including a distributed Bragg reflector (DBR).
Figure 3A:
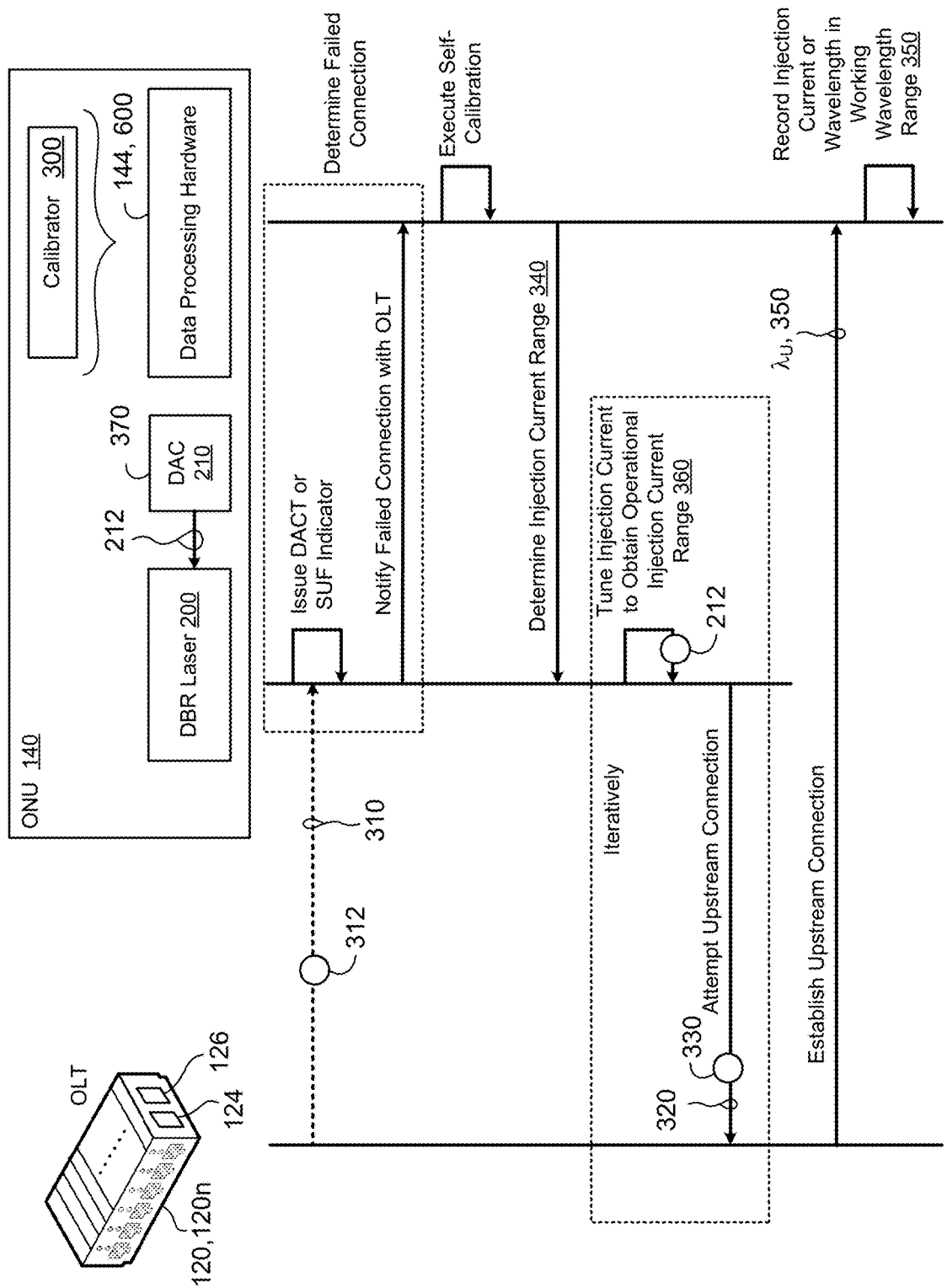
FIGS. 3A and 3B are schematic views of an exemplary embodiment of ONU data processing hardware executing a calibrator.

The ONUs 140, 140a-n are typically located at premises 152, 152a-n of the users 150, 150a-n. In some implementations, each ONU 140, 140a-n includes a corresponding optical transceiver 142, 142a-n (e.g., that includes a laser or light emitting diode). In some examples, the optical transceiver 142 includes a distributed Bragg reflector (DBR) laser 200. Each ONU 140 may include data processing hardware 144 and memory hardware 146 in communication with the data processing hardware 144. Examples of data processing hardware 144 include control hardware, circuitry, field programmable gate arrays (FPGAs), and so forth. In some examples, the data processing hardware 144 includes a digital to analog converter (DAC) 210. The DAC 210 may include a DAC configuration 370 (FIG. 3A). In other examples, the data processing hardware 144 may communicate with a digital to analog converter (DAC) 210 (e.g., via a communication bus). The DAC 210 may be configured, by the data processing hardware 144, to supply an injection current 212 to the DBR laser 200. A wavelength of the DBR laser 200 may be tuned by adjusting the injection current 212 (FIG. 2B). The memory hardware 146 may store instructions (e.g., via firmware) that when executed on the data processing hardware 144 cause the data processing hardware 144 to perform operations to adjust the injection current 212 applied to the DBR laser 200. The ONU 140 may include a photodetector that converts the downstream optical signal 104d from the OLT 120 to an electrical form. The electrical signal may be further de-multiplexed down to subcomponents (e.g., data over a network, sound waves converted into currents using microphones and back to its original physical form using speakers, images converted into currents using video cameras and converting back to physical form using a television or other video display).

FIG. 2B depicts an example DBR laser 200. Some configurations include a multi-section structure with each section/structure sharing a single substrate. As an example, the sections may include a gain section, a phase section, an Electro-absorption (EA) section, a distributed Bragg reflector (DBR) section, and a Thermoelectric Cooling section/module (TEC). In this example, each section has a P-doped Indium Phosphide (InP) region on a shared N-doped InP substrate which forms a corresponding diode ($D_0$, $D_1$, $D_2$, $D_3$) with a common cathode. These diodes may be driven by corresponding injection currents ($I_{GAIN}$, $I_{PHASE}$, $I_{DBR}$) or voltage ($V_{EA}$). The DBR laser includes a resonant cavity 214 with a highly reflective DBR mirror on one end, and a low reflectivity cleaved exit facet on the other end. The resonant cavity 214 includes a gain ridge portion. The DBR section is continuously tunable by changing injection current 212 or temperature. In some configurations, the DAC 210 provides the injection current 212 to the DBR section 214 of the laser 200. Adjusting the injection current 212 may change the refractive index of the DBR section 214 of the laser 200, shifting the resonant wavelength of the DBR cavity 214.

As the resonant wavelength of the DBR cavity 214 shifts, the laser power in the main spectral peak may diminish, affecting the power of the upstream optical signal 104u from the ONU 140. Additionally, the power in other (side) resonant modes of the DBR section 214 may increase. The difference between power in the main spectral peak and the largest side mode defines a side-mode suppression ratio (SMSR). Accordingly, as the resonant wavelength of the DBR section 214 shifts, the SMSR of the upstream optical signal 104u from the ONU 140 may decrease. The upstream optical signal 104u from the ONU 140 may fail to satisfy the connection quality criteria 330 when the SMSR is outside an acceptable range.

Tuning the injection current 212 to the DBR section 214 of the laser 200 may also favorably shift the resonant wavelength, causing the SMSR of the upstream optical signal 104u from the ONU 140 to increase. In an example, the DBR section 214 may experience an increase in resonant frequency over time, allowing a side mode to become more dominant. The SMSR of the upstream optical signal 104u from the ONU 140 accordingly decreases over time. The upstream optical signal 104u from the ONU 140 may fail to satisfy the connection quality criteria 330. Increasing the injection current 212 provided to the DBR section 214 of the laser 200 causes a red shift in the resonant wavelength of the DBR cavity 214 due to heating. In an example, the red shift partially or fully compensates the increase in resonant frequency over time. Accordingly, the SMSR of the upstream optical signal 104u from the ONU 140 may increase. When the SMSR is within the acceptable range, the upstream optical signal 104u may satisfy the connection quality criteria 330.

Figure 3B:
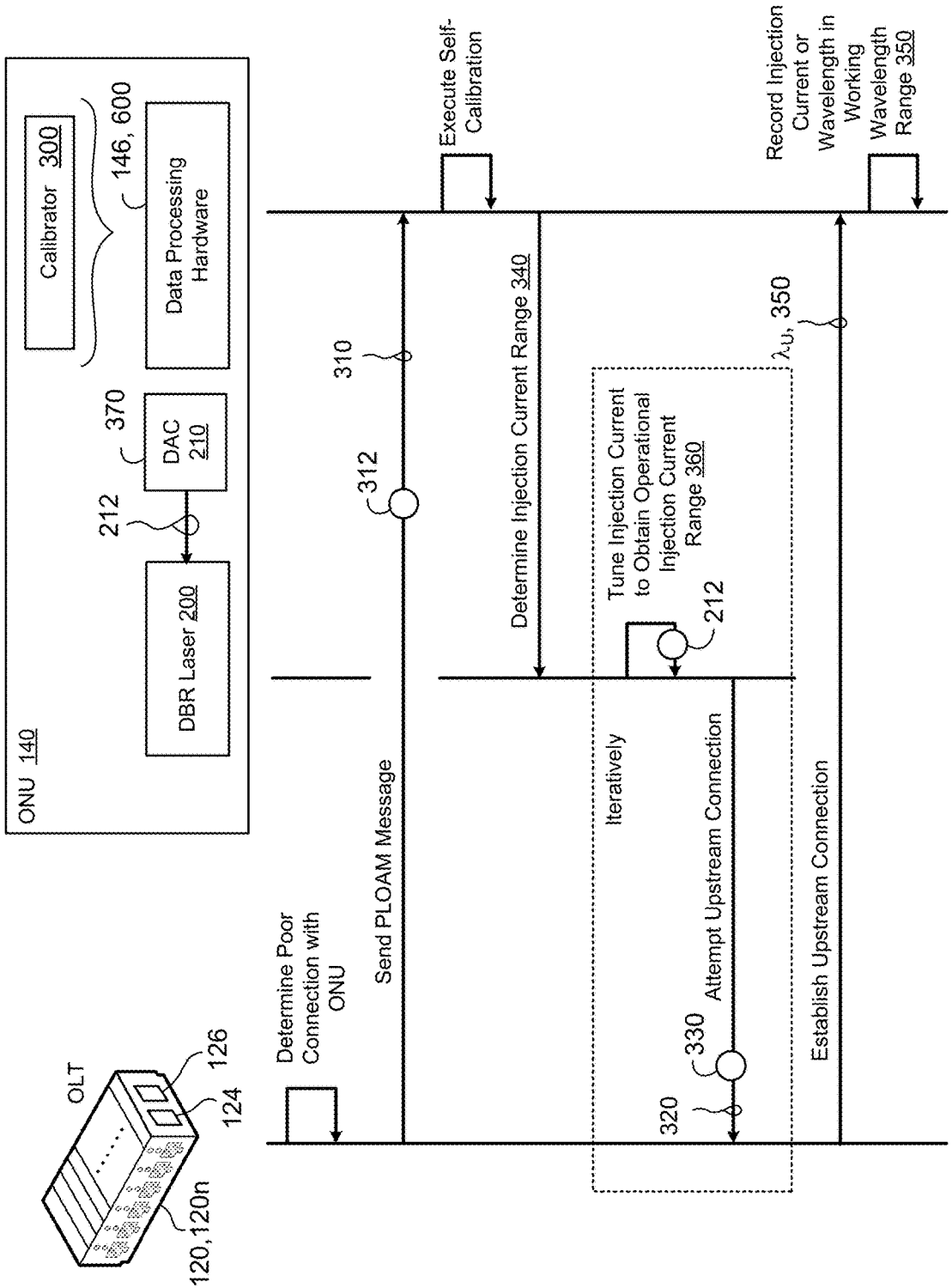

FIGS. 3A and 3B illustrate communication between an OLT 120 and an ONU 140 to detect and/or to initiate calibration for the DBR laser 200. These processes allow a calibrator 300 to evaluate whether a connection between the OLT 120 and the ONU 140 may adequately communicate data for the user 150. In some examples, the calibrator 300 detects a loss of upstream optical signal 104u from the ONU 140. In some examples, the calibrator 300 determines that the upstream optical signal 104u from the ONU 140 fails to satisfy a connection quality criteria 330. The calibrator 300 may determine that the upstream optical signal 104u fails to satisfy the connection quality criteria 330 when the SMSR is outside the acceptable range. In other words, the calibrator 300 allows the PON system 105 to sense when a resonant wavelength of the DBR section 214 drifts outside an operational wavelength range 350. The calibrator 300 performs operations (e.g., methods 400, 500) for in-situ calibration of the DBR laser 200. In some implementations, the data processing hardware 144 of the ONU 140 executes the calibrator 300. In other implementations, the calibrator 300 executes wholly or partially by any suitable computing device 600 (FIG. 6) (e.g., on the data processing hardware 124 of the OLT 120, or other computing device 600 located at the ISP's Central Office).

FIG. 3A shows an example calibrator 300 executing on the data processing hardware 144 of the ONU 140. In some examples, the data processing hardware 124 of the OLT 120 determines that the upstream optical signal 104u from the ONU 140 fails to satisfy a connection quality criteria 330. Here, the OLT 120 may determine that the upstream optical signal 104u fails to satisfy the connection quality criteria 330 when the upstream optical signal 104u includes a loss of frame (LOF). For instance, the OLT 120 may identify the LOF in the upstream optical signal 104u when the OLT 120 receives at least four invalid delimiters in the upstream optical signal 104u from the ONU 140. In additional examples, the upstream optical signal 104u fails to satisfy the connection quality criteria 330 when the OLT 120 detects a bit-error rate (BER) of the upstream optical signal 104u being greater than $10^{-y}$, where y is a configurable number between three and eight, as defined in ITU-T standard G.984.3 Gigabit-capable Passive Optical Networks (G-PON): Transmission convergence layer specification. When the upstream optical signal 104u from the ONU 140 fails to satisfy the connection quality criteria 330, the data processing hardware 124 of the OLT 120 may transmit the PLOAM deactivate message 312 to the ONU 140. In some examples, the OLT 120 transmits the PLOAM message 312 to the ONU 140 using a downstream connection 310 between the OLT 120 and the ONU 140. In these examples, the downstream connection 310 may be established by transmitting a downstream optical signal 104d from the OLT 120 to the ONU 140. The data processing hardware 144 of the ONU 140 may receive the PLOAM message 312 and issue a DACT indicator upon receiving the PLOAM deactivate message 312, as defined in ITU-T standard G.984.3 Gigabit-capable Passive Optical Networks (G-PON): Transmission convergence layer specification.

In additional examples, the data processing hardware 144 of the ONU 140 issues a start-up failure (SUF) indicator. The data processing hardware 144 of the ONU 140 may issue a SUF indicator when the ONU 140 fails to establish a connection 320 with the OLT 120 after one or more attempts. In response to the DACT or SUF indicator issued by the ONU 140, the calibrator 300 may determine that a connection 320 with the OLT 120 has failed.

When the calibrator 300 determines that a connection 320 with the OLT 120 has failed, the calibrator 300 executes a self-calibration of the DBR laser 200 to determine a working wavelength range 350 of the DBR section 214 that establishes and maintains a connection 320 with the OLT 120. Moreover, the self-calibration may determine a working wavelength range 350 having communication wavelengths satisfying one or more connection quality criteria 330. In some examples, communications wavelengths satisfying one or more connection quality criteria 330 define an operational state of the DBR laser 200. The connection quality criteria 330 may include or entail communication from the ONU 140 at a bit-error rate (BER) that satisfies a bit error threshold. The bit error threshold may indicate an acceptable level of error for transmission of data by the ONU 140 that satisfies the connection quality criteria 330. The bit error threshold may be $10^{-y}$, where y is a configurable number between three and eight, such as one in every thousand bits transmitted (e.g., one in 1000).

The self-calibration may determine an adjustable injection current range 340 of injection currents 212 that the DAC 210 applies to the DBR section 214 of the laser 200. The calibrator 300 may obtain an operational injection current range 360 of injection currents 212 by iteratively adjusting the injection current 212 within the adjustable injection current range 340. As the calibrator 300 iteratively adjusts the injection current 212 of the DBR section 214 of the laser 200, the ONU 140 transmits an upstream optical signal 104u to the OLT 120. When the ONU 140 transmits the upstream optical signal 104u to the OLT 120, the calibrator 300 determines whether the connection 320 with the OLT 120 is established. In some examples, the data processing hardware 124 of the OLT 120 also monitors whether the upstream optical signal 104u from the ONU 140 satisfies the connection quality criteria 330. When the connection 320 with the OLT is established and the upstream optical signal 104u from the ONU 140 satisfies a connection quality criteria 330, the data processing hardware 124 of the OLT 120 may transmit a PLOAM message 312 to the data processing hardware 144 of the ONU 140. In some examples, the data processing hardware 144 of the ONU 140 clears or rescinds the previously issued DACT indicator when the data processing hardware 144 receives the PLOAM message 312. In some implementations, the calibrator 300 determines that the upstream connection 320 with the OLT 120 is established when the data processing hardware 144 of the ONU 140 clears the SUF and DACT indicators. When the calibrator 300 determines that an upstream connection 320 with the OLT 120 has been established, the calibrator 300 may record the associated injection current 212. In additional implementations, the calibrator 300 records the wavelength of the DBR laser 200 associated with established upstream connections 320 with the OLT 120. In some examples, the calibrator 300 records the DAC configuration 370 associated with established upstream connections 320 as the operating injection current $212_{OPER}$.

In some configurations, the calibrator 300 determines a minimum injection current $212_{MIN}$ and a maximum injection current $212_{MAX}$ in the operational injection current range 360. The calibrator 300 may configure the DAC 210 to apply an operating injection current $212_{OPER}$ to the DBR section 214 of the laser 200, the operating injection current $212_{OPER}$ being in the operational injection current range 360. In some examples, the calibrator 300 determines a mean injection current $212_{MEAN}$ or a median injection current $212_{MED}$ in the operational injection current range 360. The calibrator 300 may configure the DAC 210 to apply either the mean injection current $212_{MEAN}$ or the median injection current $212_{MED}$ to the DBR section 214 of the laser 200. The calibrator 300 may record the injection current 212 applied to the DBR section 214 of the laser 200 in non-transitory memory of the data processing hardware 144. In additional examples, the calibrator 300 records the DAC configuration 370 corresponding to the operating injection current $212_{OPER}$ in the memory hardware 146 (FIG. 2A) of the ONU 140.

Referring to FIG. 3B, the data processing hardware 124 of the OLT 120 may monitor one or more signal quality criteria of the upstream optical signal 104u from the ONU 140. The data processing hardware 124 may determine that the connection 320 with the ONU 140 is poor. In some examples, determining that the connection 320 with the ONU 140 is poor includes detecting a loss of upstream optical signal 104u from the ONU 140. In some examples, the data processing hardware 124 determines that the upstream optical signal 104u fails to satisfy one or more connection quality criteria 330. The upstream optical signal 104u from the ONU 140 may fail to satisfy the connection quality criteria 330 when the SMSR is outside the acceptable range. When the connection 320 with the ONU 140 is poor, the data processing hardware 124 of the OLT 120 may transmit a PLOAM message 312 to the data processing hardware 144 of the ONU 140. In some examples, the calibrator 300 ignores the PLOAM message 312 when a self-calibration has been recently performed (e.g., within the previous 20 minutes). In some examples, the calibrator 300 executes a self-calibration of the DBR laser 200 to determine a working wavelength range 350 of the DBR section 214 that maintains a connection 320 with the OLT 120. Moreover, the self-calibration may determine a working wavelength range 350 having communication wavelengths satisfying one or more connection quality criteria 330. The connection quality criteria 330 may include or entail a bit-error rate (BER) of the upstream optical signal 104u from the ONU 140 satisfying a connection quality criteria 330. The calibrator 300 may determine a minimum wavelength $\lambda_{MIN}$ and a maximum wavelength $\lambda_{MAX}$ in the working wavelength range 350.

Similar to FIG. 3A, the self-calibration may include determining an adjustable injection current range 340 of injection currents 212 that the DAC 210 applies to the DBR section 214 of the laser 200. The calibrator 300 may obtain an operational injection current range 360 of injection currents 212 by iteratively adjusting the injection current 212 within the adjustable injection current range 340. When the calibrator 300 determines that an upstream connection 320 with the OLT 120 is established, the calibrator 300 may record the associated injection current 212. In additional implementations, the calibrator 300 records the wavelength of the DBR laser 200 associated with established upstream connections 320 with the OLT 120. In additional implementations, the calibrator 300 records the DAC configuration 370 of the DAC 210 associated with established upstream connections 320 with the OLT 120.

In some examples, the calibrator 300 determines a minimum injection current $212_{MIN}$ and a maximum injection current $212_{MAX}$ in the operational injection current range 360. The minimum injection current $212_{MIN}$ defines a first boundary of an operating window of the DBR laser 200. The maximum injection current $212_{MAX}$ defines a second boundary of an operating window of the DBR laser 200. The calibrator 300 may determine a mean injection current $212_{MEAN}$ or a median injection current $212_{MED}$ in the operational injection current range 360. In some examples, the calibrator 300 configures the DAC 210 to apply either the mean injection current $212_{MEAN}$ or the median injection current $212_{MED}$ to the DBR section 214 of the laser 200. The calibrator 300 may record the injection current 212 applied to the DBR laser 200 in memory hardware 126, 146.

Figure 4:
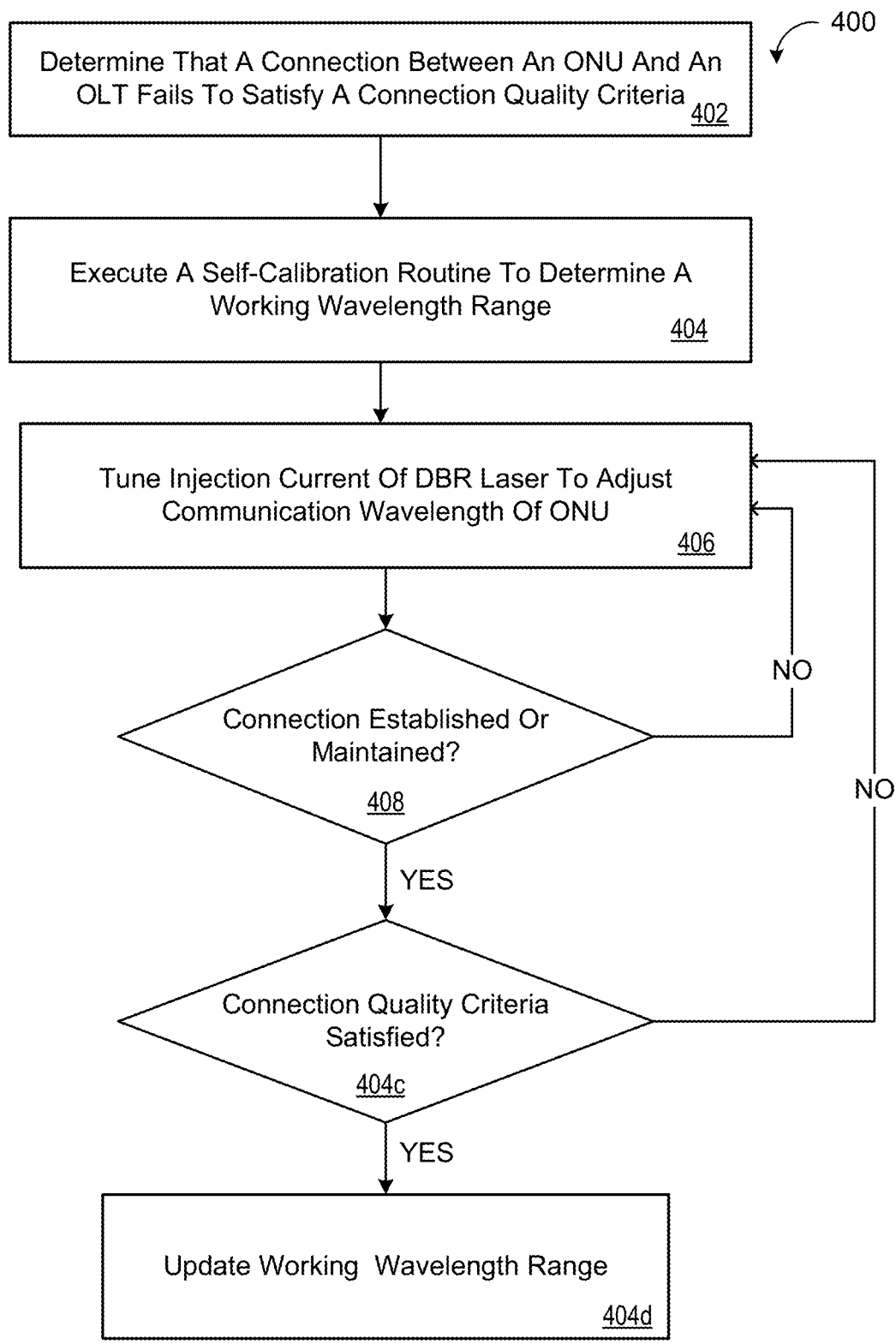
FIG. 4 is a flowchart of an example arrangement of operations for a method of in-situ calibration of a DBR laser.

FIG. 4 provides an example arrangement of operations for a method 400 of performing an in-situ calibration of a DBR laser 200. Here, the ONU 140 is deployed in a PON 105 and optically coupled to an OLT 120. At operation 402, the method 400 determines that a connection 320 between the ONU 140 and the OLT 120 fails to satisfy a connection quality criteria 330. Satisfying the connection quality criteria 330 may include satisfying at least one of bit-error rate (BER) threshold, a loss of frame (LOF) indicator, a start-up failure (SUF) indicator, or a loss of connection indicator. At operation 404, the method 400 executes a self-calibration routine to determine a working wavelength range 350 for the DBR laser 200 that maintains the connection 320 between the OLT 120 and the ONU 140 and satisfies the connection quality criteria 330. Executing the self-calibration routine includes executing operations 406-412 interatively.

At operation 406, the method 400 tunes an injection current 212 of the DBR section 214 of the laser 200 to adjust a communication wavelength of the ONU 140. Here, the method 400 configures a DAC 210 to supply the injection current 212 to the DBR section 214 of the laser 200, whereby the DAC 210 includes a DAC configuration 370. At operation 408, the method 400 determines whether the communication wavelength establishes or maintains a connection 320 between the OLT 120 and the ONU 140. When the communication wavelength fails to establish or maintain the connection 320 (e.g., operation 408 is a "NO"), the method 400 reverts back to operation 406. On the other hand, when the communication wavelength establish or maintains the connection 320 (e.g., operation 408 is a "YES"), the method 400 proceeds to operation 410 to determine whether the connection 320 satisfies the connection quality criteria 330. When the connection 320 fails to satisfy the connection quality criteria 330 (e.g., operation 410 is a "NO"), the method 400 reverts back to operation 406. On the other hand, when the connection 320 satisfies the connection quality criteria 330 (e.g., operation 410 is a "YES"), the method 400 proceeds to operation 412 and updates the working wavelength range 350 for the DBR section 214 of the laser 200 to include the communication wavelength. In some examples, the method 400 records the DAC configuration 370 associated with the working wavelength range 350.

Figure 5:
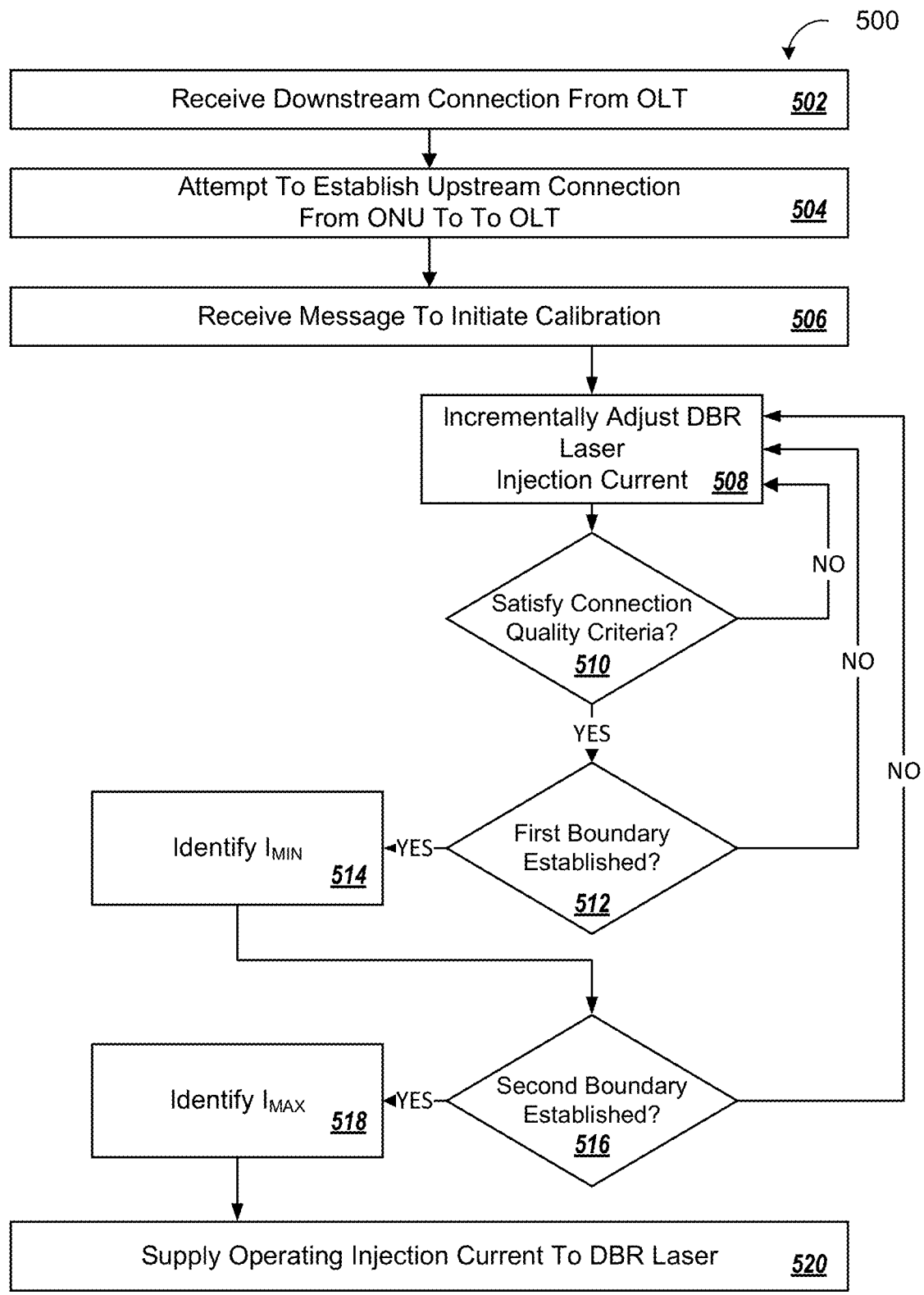
FIG. 5 is a flowchart of an example arrangement of operations for a method of in-situ calibration of a DBR laser.

FIG. 5 provides an example arrangement of operations for a method 500 of performing an in-situ calibration of a DBR laser 200 of an ONU 140, wherein the ONU 140 is deployed in a PON 105 and optically coupled to an OLT 120. At operation 502, the method 500 receives, at the ONU 140, a downstream connection 310 from the OLT 120. The downstream connection 310 may be established by transmitting, from the OLT 120, a downstream optical signal 104d and receiving the downstream signal 104d at the ONU 140. At operation 504, the method 500 attempts to establish an upstream connection 320 with the OLT 120. The upstream connection 320 may be established by transmitting, from the ONU 140, an upstream optical signal 104u and receiving the upstream signal 104u at the OLT 120. The upstream connection 320 may fail to satisfy a connection quality criteria 330. Failing to satisfy the connection quality criteria 330 may indicate that the DBR laser 200 is operating outside an operational state defined by the connection quality criteria 330. The DBR laser 200 may be operating outside the operational state when the SMSR of the upstream optical signal 104u from the ONU 140 is outside the acceptable range. At operation 506, the method 500 receives a message 312 from the OLT 120 to initiate calibration of the ONU 140. Here, the message 312 may be generated by the OLT 120 to indicate that the DBR laser 200 is operating outside an operational state. Some examples of the message 312 include PLOAM messages, messages adhering to the Technical Report 069 (TR-069) or other CPE remote-management specification, and commands issued from the ISP's Central Office via TELNET or other remote execution protocol.

At operation 508, the method 500 configures a DAC 210 to incrementally adjust an injection current 212 supplied to the DBR section 214 of the laser 200. Here, the DAC 210 includes a DAC configuration 370. In some implementations, the method 500 monotonically increments the injection current 212 from a low current to a high current. The method may also monotonically decrease the current from a high current to a low current. Other incremental adjustment techniques may also be used. At operation 510, the method 500 determines whether the upstream connection 320 satisfies the connection quality criteria 330. Satisfying the connection quality criteria 330 may indicate that the DBR laser 200 is operating within the operational state. The DBR laser 200 may be operating within the operational state when the SMSR of the upstream optical signal 104u from the ONU 140 is within the acceptable range. When the upstream connection 320 fails to satisfy the connection quality criteria 330 (e.g., operation 510 is "NO"), the method 500 reverts back to operation 508. On the other hand, when the upstream connection 320 satisfied the connection quality criteria 330, the method 500 proceeds to operation 512 and determines whether the injection current 212 establishes a first boundary of the operating window of the DBR laser 200. When the injection current 212 fails to establish the first boundary (e.g., operation 512 is "NO"), the method 500 reverts back to operation 508. On the other hand, when the injection current 212 establishes the first boundary of the operating window of the DBR laser 200 (e.g., operation 512 is "YES"), the method 500 proceeds to operation 514 and identifies a first injection current 212 as the first boundary of the operating window of the DBR laser 200. In some examples, the first injection current is a minimum injection current $212_{MIN}$ associated with the operating window of the DBR laser 200.

At operation 516, the method 500 determines whether the injection current 212 establishes a second boundary of the operating window of the DBR laser 200. The method 500 may perform operation 516 after adjusting the injection current at operation 508 when the first injection current 212 fails to satisfy the connection quality criteria at operation 512. When the injection current 212 fails to establish the second boundary (e.g., operation 516 is "NO"), the method 500 reverts back to operation 508. On the other hand, when the injection current 212 establishes the second boundary of the operating window of the DBR laser 200 (e.g., operation 516 is "YES"), the method 500 proceeds to operation 518 and identifies a second injection current 212 as the second boundary of the operating window of the DBR laser 200. In some examples, the second injection current is a maximum injection current $212_{MAX}$ associated with the operating window of the DBR laser 200.

At operation 510, the method 500 supplies an operating injection current to the DBR laser 200, the operating injection current being between the first injection current $212_{MIN}$ and the second injection current $212_{MAX}$. In some examples, the operating injection current is a median or a mean of the first injection current $212_{MIN}$ and the second injection current $212_{MAX}$.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
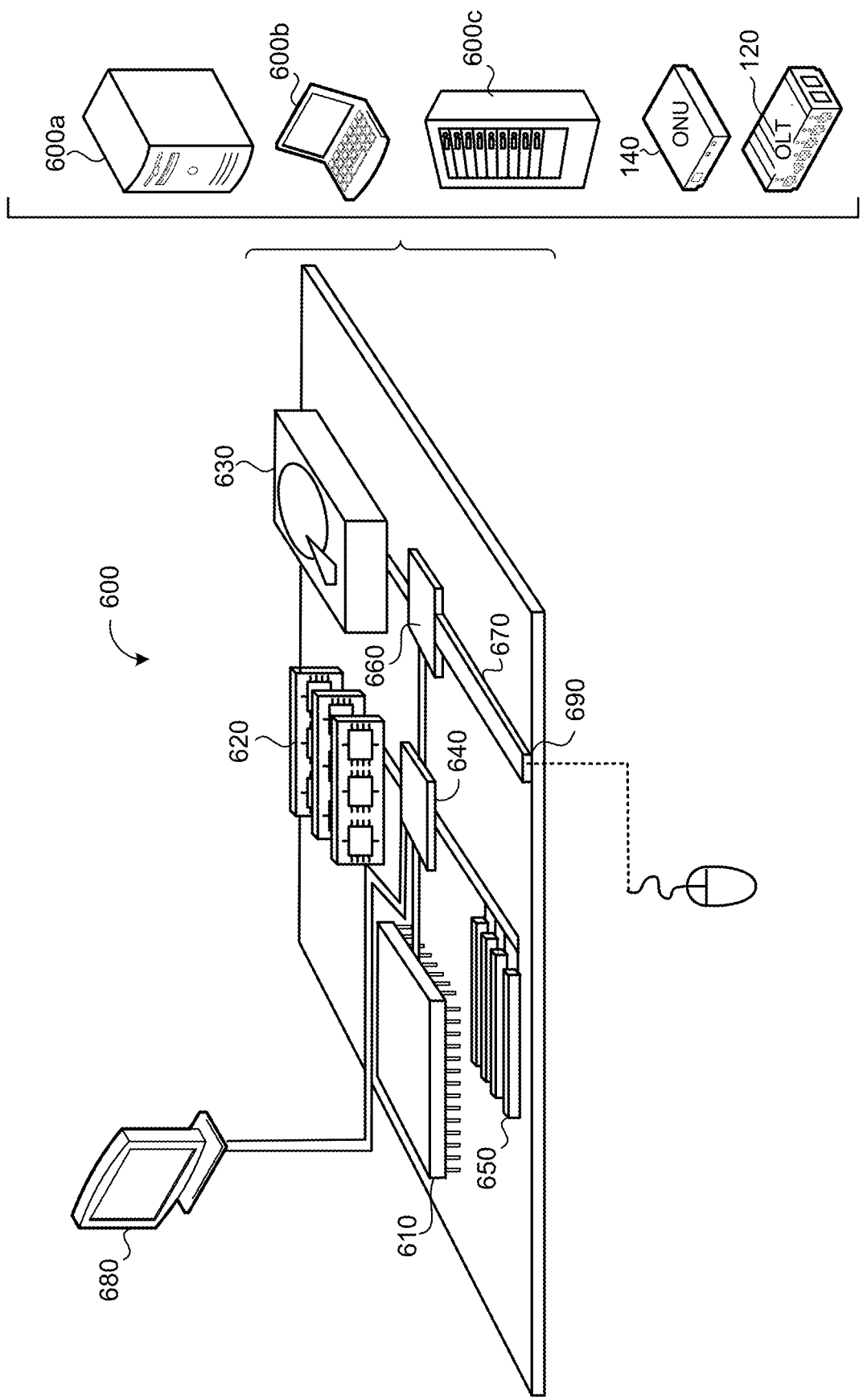
FIG. 6 is schematic view of an example computing device that may be used to implement the systems and methods described in this document.

FIG. 6 is schematic view of an example computing device 600 that may be used to implement the systems (e.g., calibrator 300) and methods (e.g., methods 400, 500) described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (e.g., data processing hardware 124, 144), memory 620 (e.g., memory hardware 126, 146), a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. Processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The computing device 600 may be implemented in a number of different forms, as shown in the figure. For example, it may be implemented as a standard server 600a or multiple times in a group of such servers 600a, as a laptop computer 600b, or as part of a rack server system 600c. In some examples, the computing device 600 may be partially or wholly implemented as part of an ONU 140 in an optical communication system 100.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Processes and logic flows described in this specification can be performed by one or more programmable processors executing one or more computer programs to perform functions by operating on input data and generating output. Processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks, magneto optical disks, and CD ROM and DVD-ROM disks). Processor and the memory can be supplemented by, or incorporated in, special purpose logic circuitry.

To provide for interaction with a user, one or more aspects of the disclosure can be implemented on a computer having a display device; e.g., a CRT (cathode ray tube), LCD (liquid crystal display) monitor, or touch screen for displaying information to the user and optionally a keyboard and a pointing device (e.g., a mouse or a trackball), by which the user can provide input to the computer. Other kinds of devices can be used to provide interaction with a user as well. For example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    determining, by data processing hardware, that a connection between an optical line terminal (OLT) and an optical network unit (ONU) fails to satisfy a connection quality criteria, the ONU comprising a Distributed Bragg Reflector (DBR) laser; and
    executing, by the data processing hardware, a self-calibration routine to determine a working wavelength range for the DBR laser that maintains the connection between the OLT and the ONU and satisfies the connection quality criteria, the self-calibration routine comprising iteratively:
        tuning an injection current of the DBR laser to adjust a communication wavelength of the ONU;
        determining whether the communication wavelength establishes or maintains the connection between the OLT and the ONU;
        when the communication wavelength establishes or maintains the connection between the OLT and the ONU, determining whether the connection satisfies the connection quality criteria; and
        when the connection satisfies the connection quality criteria, updating the working wavelength range for the DBR laser to include the communication wavelength.

2. The method of claim 1, wherein the connection quality criteria comprises satisfying at least one of a packet loss threshold, a loss of frame (LOF) indicator, a start-up failure (SUF) indicator, or a loss of connection indicator.

3. The method of claim 1, wherein determining that the connection between the OLT and the ONU fails to satisfy the connection quality criteria comprises receiving a physical layer operations, administrations, and maintenance (PLOAM) message from the OLT indicating a failure to satisfy the connection quality criteria.

4. The method of claim 1, determining that the connection between the OLT and the ONU fails to satisfy the connection quality criteria comprises receiving, from firmware of the ONU, a loss of frame (LOF) indicator, a loss of signal (LOS) indicator, or a start-up failure (SUF) indicator.

5. The method of claim 1, wherein the self-calibration routine comprises:
    determining a maximum wavelength of the working wavelength range and a minimum wavelength of the working wavelength range; and
    setting the injection current of the DBR laser to an operating injection current within the working wavelength range.

6. The method of claim 5 wherein the operating injection current comprises a mean or median of the working wavelength range.

7. The method of claim 1, wherein determining that the connection between the OLT and the ONU fails to satisfy the connection quality criteria comprises receiving, from firmware of the OLT, a loss of frame (LOF) indicator.

8. The method of claim 1, wherein determining that the connection between the OLT and the ONU fails to satisfy the connection quality criteria comprises receiving, from firmware of the ONU, a deactivate (DACT) indicator.

9. The method of claim 1, wherein determining that the connection satisfies the connection quality criteria comprises determining that the ONU has cleared the DACT indicator.

10. A system comprising:
    data processing hardware; and
    memory hardware in communication with the data processing hardware, the memory hardware storing instructions that when executed on the data processing hardware cause the data processing hardware to perform operations comprising:
        determining that a connection between an optical line terminal (OLT) and an optical network unit (ONU) fails to satisfy a connection quality criteria, the ONU comprising a Distributed Bragg Reflector (DBR) laser; and
        executing a self-calibration routine to determine a working wavelength range for the DBR laser that maintains the connection between the OLT and the ONU and satisfies the connection quality criteria, the self-calibration routine comprising iteratively:
            tuning an injection current of the DBR laser to adjust a communication wavelength of the ONU;
            determining whether the communication wavelength establishes or maintains the connection between the OLT and the ONU;
            when the communication wavelength establishes or maintains the connection between the OLT and the ONU, determining whether the connection satisfies the connection quality criteria; and
            when the connection satisfies the connection quality criteria, updating the working wavelength range for the DBR laser to include the communication wavelength.

11. The system of claim 10, wherein the connection quality criteria comprises satisfying at least one of a packet loss threshold, a loss of frame (LOF) indicator, a start-up failure (SUF) indicator, or a loss of connection indicator.

12. The system of claim 10, wherein determining that the connection between the OLT and the ONU fails to satisfy the connection quality criteria comprises receiving a physical layer operations, administrations, and maintenance (PLOAM) message from the OLT indicating the failure to satisfy the connection quality criteria.

13. The system of claim 10, determining that the connection between the OLT and the ONU fails to satisfy the connection quality criteria comprises receiving, from firmware of the ONU, a loss of frame (LOF) indicator, a loss of signal (LOS) indicator, or a start-up failure (SUF) indicator.

14. The system of claim 10, wherein the self-calibration routine comprises:
    determining a maximum wavelength of the working wavelength range and a minimum wavelength of the working wavelength range; and setting the injection current of the DBR laser to an operating injection current within the working wavelength range.

15. The system of claim 14 wherein the operating injection current comprises a mean or median of the working wavelength range.

16. The system of claim 10, wherein determining that the connection between the OLT and the ONU fails to satisfy the connection quality criteria comprises receiving, from firmware of the OLT, a loss of frame (LOF) indicator.

17. The system of claim 10, wherein determining that the connection between the OLT and the ONU fails to satisfy the connection quality criteria comprises receiving, from firmware of the ONU, a deactivate (DACT) indicator.

18. The system of claim 10, wherein determining that the connection satisfies the connection quality criteria comprises determining that the ONU has cleared the DACT indicator.

19. A method comprising:
   receiving, at data processing hardware of an optical network unit (ONU), a downstream connection from an optical line terminal (OLT), the ONU comprising a Distributed Bragg Reflector (DBR) laser;
   attempting, by the data processing hardware, to establish an upstream connection between the ONU and the OLT;
   when the ONU establishes the upstream connection to the OLT, receiving, at the data processing hardware of the ONU, a message to initiate calibration of the ONU, the message generated to indicate that the DBR laser is operating outside an operational state; and
   tuning, by the data processing hardware of the ONU, the DBR laser to the operational state by adjusting an injection current for the DBR laser,
   wherein tuning the DBR laser to the operational state comprises:
      adjusting the injection current for the DBR laser to a first injection current:
      determining that the first injection current for the DBR laser establishes the upstream connection between the ONU and the OLT;
      identifying the first injection current as a first boundary of an operating window of the operational state of the DBR laser;
      adjusting the injection current for the DBR laser to a second injection current;
      determining that the second injection current for the DBR laser fails to maintain or establish the upstream connection between the ONU and the OLT;
      identifying the second injection current as a second boundary of the operating window of the operational state of the DBR laser; and
      supplying an operating injection current to the DBR laser, the operating injection current being between the first injection current and the second injection current.

20. The method of claim 19, wherein the operating injection current is a mean of or a median of the first injection current and the second injection current.

21. The method of claim 19, wherein, adjusting the injection current for the DBR laser to the first injection current comprises incrementally altering the injection current.

22. The method of claim 19, wherein determining that the second injection current for the DBR laser fails to maintain or establish the upstream connection between the ONU and the OLT comprises receiving a start-up failure (SUF) indicator or a deactivate (DACT) indicator at the ONU.

23. The method of claim 19, further comprising, when the ONU fails to establish the upstream connection to the OLT, initiating calibration of the ONU.

24. The method of claim 19, further comprising, when the ONU establishes the upstream connection to the OLT, communicating data from the ONU at a bit error rate that satisfies a bit error threshold, the bit error threshold indicating an acceptable level of error for transmission of data by the ONU.

25. The method of claim 24, wherein receiving a DACT indicator at the ONU indicates failure to satisfy the bit error threshold.

26. A system comprising:
   an optical network unit (ONU) comprising a Distributed Bragg Reflector (DBR) laser;
   data processing hardware; and
   memory hardware in communication with the data processing hardware, the memory hardware storing instructions that when executed on the data processing hardware cause the data processing hardware to perform operations comprising:
      receiving a downstream connection from an optical line terminal (OLT) to the ONU;
      attempting to establish an upstream connection between the ONU and the OLT;
      when the ONU establishes the upstream connection to the OLT, receiving a message to initiate calibration of the ONU, the message generated to indicate that the DBR laser is operating outside an operational state; and
      tuning the DBR laser to the operational state by adjusting an injection current for the DBR laser,
      wherein tuning the DBR laser to the operational state comprises:
         adjusting the injection current for the DBR laser to a first injection current:
         determining that the first injection current for the DBR laser establishes the upstream connection between the ONU and the OLT;
         identifying the first injection current as a first boundary of an operating window of the operational state of the DBR laser;
         adjusting the injection current for the DBR laser to a second injection current;
         determining that the second injection current for the DBR laser fails to maintain or establish the upstream connection between the ONU and the OLT;
         identifying the second injection current as a second boundary of the operating window of the operational state of the DBR laser; and
         supplying an operating injection current to the DBR laser, the operating injection current being between the first injection current and the second injection current.

27. The system of claim 26, wherein the operating injection current is a mean of or a median of the first injection current and the second injection current.

28. The system of claim 26, wherein:
   adjusting the injection current for the DBR laser to the first injection current comprises incrementally altering the injection current.

29. The system of claim 26, wherein determining that the second injection current for the DBR laser fails to maintain or establish the upstream connection between the ONU and the OLT comprises receiving a start-up failure (SUF) indicator or a deactivate (DACT) indicator at the ONU.

30. The system of claim 26, further comprising, when the ONU fails to establish the upstream connection to the OLT, initiating, by the data processing hardware of the ONU, calibration of the ONU.

31. The system of claim 26, further comprising, when the ONU establishes the upstream connection to the OLT, communicating data from the data processing hardware of the ONU at a bit error rate that satisfies a bit error threshold, the bit error threshold indicating an acceptable level of error for transmission of data by the ONU.

32. The system of claim 31, wherein receiving a DACT indicator at the ONU indicates failure to satisfy the bit error threshold.

* * * * *